United States Patent
Lee et al.

(10) Patent No.: US 6,722,576 B1
(45) Date of Patent: Apr. 20, 2004

(54) METHOD FOR OPERATING AIR CONDITIONER IN WARMING MODE

(75) Inventors: Won Hee Lee, Seoul-si (KR); Cheol Min Kim, Kwangmyung-si (KR); Woo Ho Cha, Seoul (KR); Yoon Jei Hwang, Seoul (KR); Deok Huh, Buchun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/442,973

(22) Filed: May 22, 2003

(30) Foreign Application Priority Data

Dec. 5, 2002 (KR) .................................... 2002-77074

(51) Int. Cl.$^7$ ............................................. G05D 23/00
(52) U.S. Cl. ....................... 237/2 B; 62/175; 236/1 EA
(58) Field of Search ................................ 237/2 A, 2 B; 417/3, 8; 62/175, 238.7, 238.6; 236/1 EA, 1 E

(56) References Cited

U.S. PATENT DOCUMENTS

| | | | | |
|---|---|---|---|---|
| 4,124,177 A | * | 11/1978 | Timmerman | 237/2 B |
| 4,323,109 A | * | 4/1982 | Jaster | 165/45 |
| 4,367,634 A | * | 1/1983 | Bolton | 62/238.6 |
| 4,505,328 A | * | 3/1985 | Schmitt | 165/53 |
| 4,592,206 A | * | 6/1986 | Yamazaki et al. | 62/160 |
| 4,627,483 A | * | 12/1986 | Harshbarger et al. | 237/2 A |
| 4,796,437 A | * | 1/1989 | James | 62/79 |
| 4,860,552 A | * | 8/1989 | Beckey | 62/158 |
| 5,228,302 A | * | 7/1993 | Eiermann | 62/90 |
| 5,366,153 A | * | 11/1994 | Swenson | 237/19 |
| 5,367,601 A | * | 11/1994 | Hannabery | 392/307 |
| 5,465,588 A | * | 11/1995 | McCahill et al. | 62/127 |
| 6,418,737 B1 | * | 7/2002 | Kuroki et al. | 62/156 |

* cited by examiner

Primary Examiner—Derek Boles
(74) Attorney, Agent, or Firm—Greenblum & Bernstein, P.L.C.

(57) ABSTRACT

Disclosed is a method for operating an air conditioner in a warming mode, including the 100% operation performing step of operating/stopping all of compressors, the load determining step of determining a warming load to be eliminated after completion of the 100% operation performing step, the 100%/X% operation performing step of operating all of the compressors when it is determined at the load determining step that the warming load is not large, subsequently stopping a part of the compressors, and subsequently stopping the remainder of the compressors, the sensing step of sensing the number of stoppages of the remainder of the compressors after completion of the 100%/X% operation performing step, and the X% operation performing step of operating/stopping the remainder of the compressors when the sensed number of stoppage times reaches a predetermined number. Since the 100%/X% operation is carried out in response to a warming load generated after the 100% operation, this method properly copes with the warming load at an initial stage of the warming mode. Further, since the X% operation is carried out after the 100%/X% operation is repeated in a predetermined number, the method of the present invention precisely and promptly copes with the variation of the warming load.

10 Claims, 5 Drawing Sheets

METHOD FOR OPERATING AIR CONDITIONER IN WARMING MODE

BACKGROUND OF THE INVENTION

1. Field of the Invention

The present invention relates to an air conditioner, and more particularly to a method for operating an air conditioner to rapidly and efficiently eliminate a warming load.

2. Description of the Related Art

Generally, an air conditioner is an appliance for cooling or warming a room using a cooling cycle of a refrigerant compressed into a high-temperature and high-pressure state by a compressor.

The compressor includes a compressing unit having a compressing chamber for compressing the refrigerant, and a motor unit for varying the volume of the compressing chamber. In the case of an air conditioner equipped with a plurality of indoor units or a large-capacity air conditioner, a plurality of compressors are used. In association with such an air conditioner, it is possible to reduce the consumption of electric power required to drive compressors by varying the capacity of the compressors in accordance with the load to be eliminated.

FIG. 1 is a schematic diagram illustrating a cooling cycle established in a conventional air conditioner. FIG. 2 is a schematic diagram illustrating a warming cycle established in the conventional air conditioner.

As shown in FIGS. 1 and 2, the conventional air conditioner includes an indoor heat exchanger 2 for heat-exchanging air in a room with a refrigerant, thereby cooling or warming the room, an outdoor heat exchanger 4 serving as a condenser for condensing the refrigerant when the indoor heat exchanger 2 functions as a cooler, while serving as an evaporator for evaporating the refrigerant when the indoor heat exchanger 2 functions as a heater, and first and second compressors 6 and 16 for compressing the refrigerant from a low-temperature and low-pressure gaseous state into a high-temperature and high-pressure gaseous state in order to supply the high-temperature and high-pressure gaseous refrigerant to the indoor heat exchanger 2 or outdoor heat exchanger 4. The air conditioner also includes an expansion device 8 arranged between the indoor heat exchanger 2 and the outdoor heat exchanger 4, and adapted to expand the refrigerant into a low-temperature and low-pressure state, and a control unit (not shown) for controlling operations of the first and second compressors 6 and 16 in response to an operation of the user and in accordance with the load to be eliminated. The indoor heat exchanger 2, the outdoor heat exchanger 4, the first and second compressors 6 and 16, and the expansion device 8 are connected by a refrigerant pipe 9.

In FIGS. 1 and 2, the reference numeral 24 denotes a common accumulator to which respective suction lines 6a and 16a of the first and second compressors 6 and 16 are connected. This common accumulator 24 serves to store a liquid refrigerant not evaporated by the indoor heat exchanger 2 or outdoor heat exchanger 4, in order to prevent the liquid refrigerant from being introduced into the first and second compressors 6 and 16. Introduction of such a liquid refrigerant into the compressors 6 and 16 may cause failure of those compressors 6 and 16.

Also, the reference numeral 26 denotes a direction change valve, for example, a 4-way valve, adapted to change the flowing direction of the refrigerant in accordance with a control signal from the control unit so that the air conditioning system is used for a cooling or warming purpose. This 4-way valve 26 communicates with the common accumulator 24 and respective discharge lines 6b and 16b of the first and second compressors 6 and 16. The 4-way valve 26 guides the high-temperature and high-pressure gaseous refrigerant compressed by the first compressor 6 or second compressor 16 to the outdoor heat exchanger 4 in a cooling mode, while it guides the same gaseous refrigerant to the indoor heat exchanger 2 in a warming mode.

The reference numerals 32 and 34 are check valves respectively installed in the discharge lines 6b and 16b of the first and second compressors 6 and 16, and adapted to prevent the refrigerant discharged from the currently-operating compressor, for example, the first compressor 6, from being introduced into the currently-stopped compressor, for example, the second compressor 16.

Meanwhile, the first compressor 6 has a capacity of X%, for example, 60%, whereas the second compressor 16 has a capacity of Y%, for example, 40%. Compressor operation is carried out with a capacity of 100% or X% by operating both the first and second compressors 6 and 16 or operating only the first compressor 6 in accordance with a control signal from the control unit.

Now, the conventional air conditioner having the above-described configuration will be described.

When the air conditioner is set to operate in a warming mode under the condition in which a target temperature $T_0$ is set, the control unit first switches the operating position of the 4-way valve 26 to correspond to the warming mode, as shown in FIG. 2, and operates the first and second compressors 6 and 16.

The first and second compressors 6 and 16 discharge a high-temperature and high-pressure gaseous refrigerant which, in turn, passes through the indoor heat exchanger 2. The refrigerant is condensed while discharging heat therefrom around the indoor heat exchanger 2. In this case, the indoor heat exchanger 2 serves as a heater.

The refrigerant condensed into a high-temperature and high-pressure liquid state while passing through the indoor heat exchanger 2 then passes through the expansion device 8 which, in turn, expands the refrigerant into a low-temperature and low-pressure state so as to change the refrigerant into an easily evaporable state. The expanded refrigerant is then sent to the outdoor heat exchanger 4. The refrigerant absorbs heat around the outdoor heat exchanger 4 while passing through the outdoor heat exchanger 4, so that it is evaporated. The resultant refrigerant is introduced into the first and second compressors 6 and 16. Thus, a warming cycle is established.

Once the warming load is substantially eliminated in accordance with the above-described operations of the first and second compressors 6 and 16, only the first compressor 6 is repeatedly operated and stopped in order to cope with a subsequent warming load under the condition that the second compressor 16 is maintained in a stopped state.

FIG. 3 is a graph depicting a variation in compression capacity depending on a variation in room temperature in the warming mode of the conventional air conditioner.

When the indoor heat exchanger 4 performs a warming operation in accordance with operations of the first and second compressors 6 and 16, the room temperature T is increased, as shown in FIG. 3. When the room temperature T exceeds an upper temperature limit of $T_0+\Delta T$ higher than the target temperature $T_0$ by an allowable temperature deviation $\Delta T$ of, for example, 0.5° C., the control unit stops the first and second compressors 6 and 16.

Subsequently, the room temperature T decreases gradually because the first and second compressors 6 and 16 are maintained in a stopped state. When the room temperature T is lowered below a lower temperature limit of $T_0-\Delta T$ lower than the target temperature $T_0$ by an allowable temperature deviation $\Delta T$ of, for example, 0.5° C., the control unit again operates the first and second compressors 6 and 16.

On the other hand, when the room temperature T again exceeds the upper temperature limit of $T_0+\Delta T$ in accordance with the re-operations of the first and second compressors 6 and 16, the control unit again stops the first and second compressors 6 and 16.

After operating the first and second compressors 6 and 16 two times in the above manner, the control unit determines that the warming load is substantially eliminated. Based on this determination, the control unit operates only the first compressor 6 when the room temperature T is again lowered below the lower temperature limit of $T_0-\Delta T$, and subsequently stops the first compressor 6 when the room temperature T again exceeds the upper temperature limit of $T_0+\Delta T$.

Thus, the air conditioner copes with subsequent warming loads by repeatedly operating and stopping the first compressor 6.

Although the warming operation of the conventional air conditioner is carried out in such a fashion that an X% operation is repeatedly and intermittently performed following the two 100% operations, there is a problem in that the time taken for the room temperature T lowered after the two 100% operations to again reach the target temperature may be lengthened because the X% operation is achieved only by the first compressor 6, so that the X% operation should be carried out for an extended time.

Further, since the X% operation is performed without the determination of the warming load after the two 100% operations, there is a problem in that it is difficult to properly cope with the warming load at an initial stage of the warming mode.

In order to solve the above problems caused by the X% operation, another operating method was proposed. In accordance with this operating method, a 100%/X% operation is carried out by operating both the first and second compressors 6 and 16 at an initial stage of the warming mode, thereby performing a 100% operation, stopping second compressor 16 during the operations of the first and second compressors 6 and 16, thereby performing an X% operation, and stopping the first compressor 6 when the room temperature T exceeds the upper temperature limit of $T_0+\Delta T$. The 100%/X% operation is repeated when the room temperature T is lowered below the lower temperature limit of $T_0-\Delta T$. However, this operating method has a problem in that the consumption of electric power increases because both the first and second compressors 6 and 16 operate even when the room temperature T can rapidly reach the target temperature by operating only the first compressor in accordance with a substantial elimination of the warming load by the 100%/X% operation repeatedly carried out several times.

Further, in case that the 100% operation is first carried out, the 100%/X% operation is subsequently carried out after the 100% operation, and the X% operation is subsequently carried out after the 100%/X% operation, it is required to precisely and rapidly determine whether the X% operation follows the 100%/X% operation, i.e., whether the 100%/X% operation is repeated in response to the variation of the warming load.

SUMMARY OF THE INVENTION

The present invention has been made in view of the above-mentioned problems involved with the related art, and an object of the invention is to provide a method for operating an air conditioner in a warming mode which is capable of precisely and rapidly coping with a warming load while reducing the consumption of electric power.

In accordance with the present invention, this object is accomplished by providing a method for operating an air conditioner equipped with a plurality of compressors in a warming mode by operating a part or all of the compressors in accordance with a warming load to warm air in a room, comprising the steps of: (A) operating/stopping all of the compressors; (B) determining a warming load to be eliminated after execution of the step (A); (C) operating all of the compressors when it is determined at the step (B) that the warming load is not large, subsequently stopping a part of the compressors, and subsequently stopping the remainder of the compressors; (D) sensing the number of stoppages of the remainder of the compressors after execution of the step (C) and (E) operating/stopping the remainder of the compressors when the number of stoppages sensed at the step (D) reaches a predetermined number.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail with reference to the annexed drawings.

Figure 1:
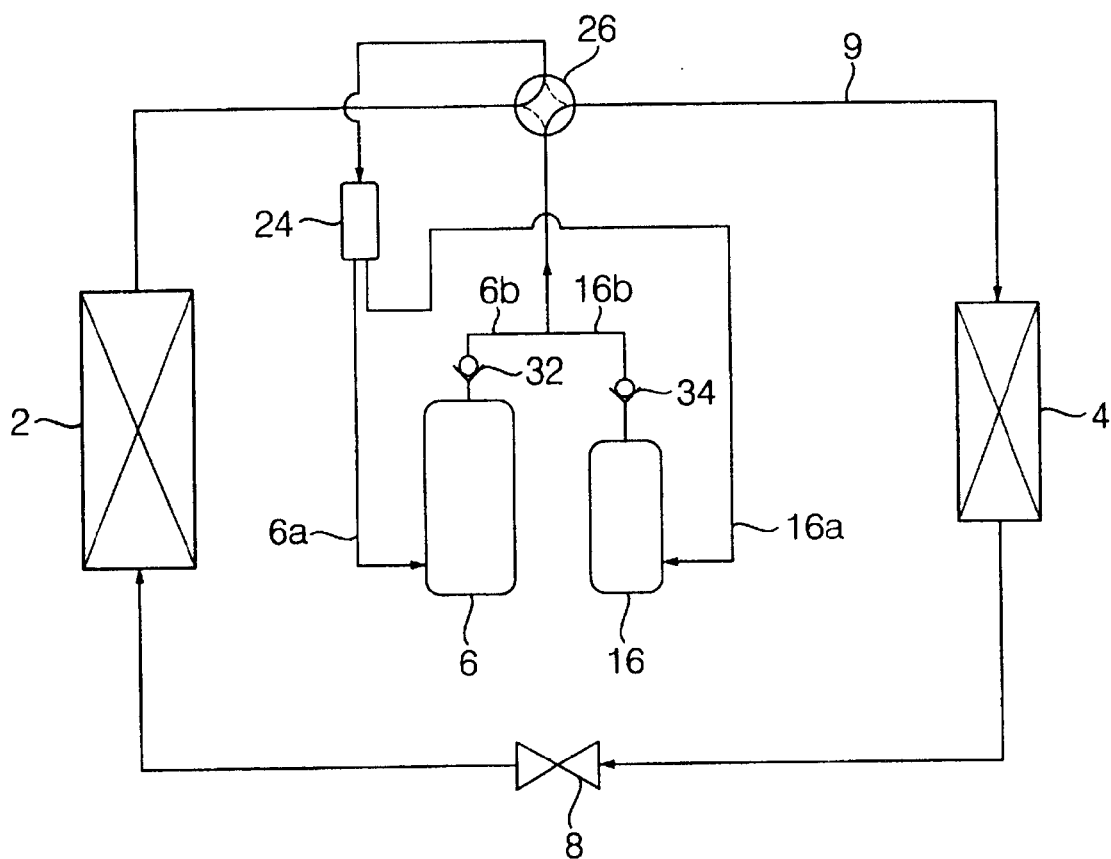
FIG. 1 is a schematic diagram illustrating a cooling cycle established in a conventional air conditioner.
Figure 2:
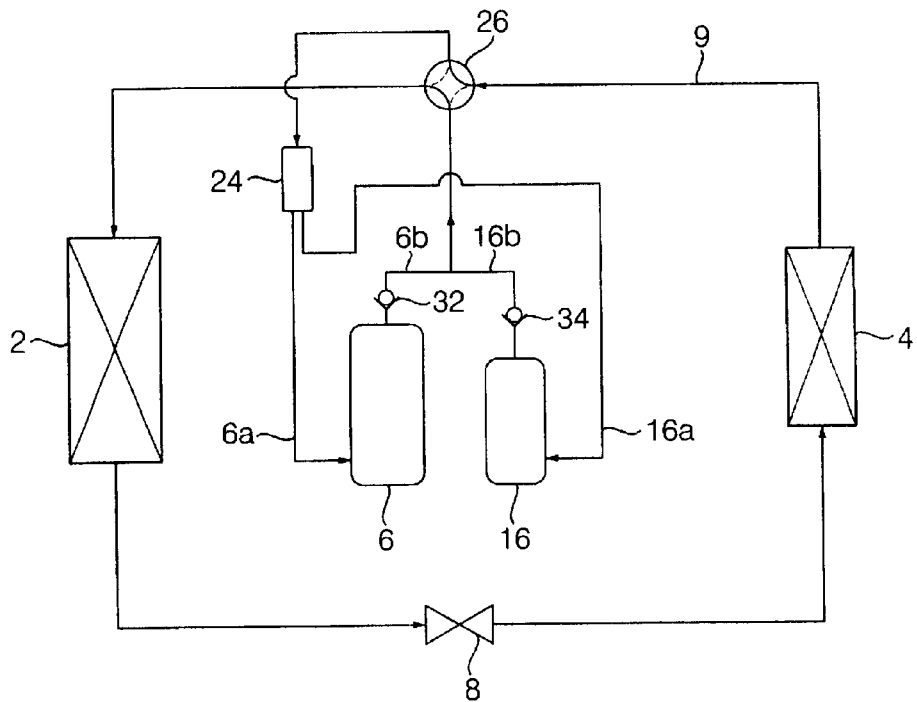
FIG. 2 is a schematic diagram illustrating a warming cycle established in the conventional air conditioner.
Figure 3:
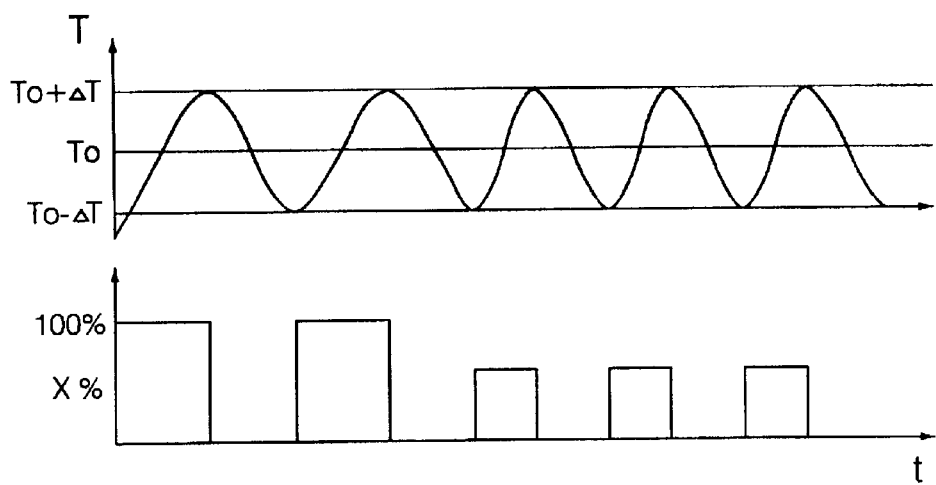
FIG. 3 is a graph depicting a variation in compression capacity depending on a variation in room temperature in the warming mode of the conventional air conditioner.
Figure 4:
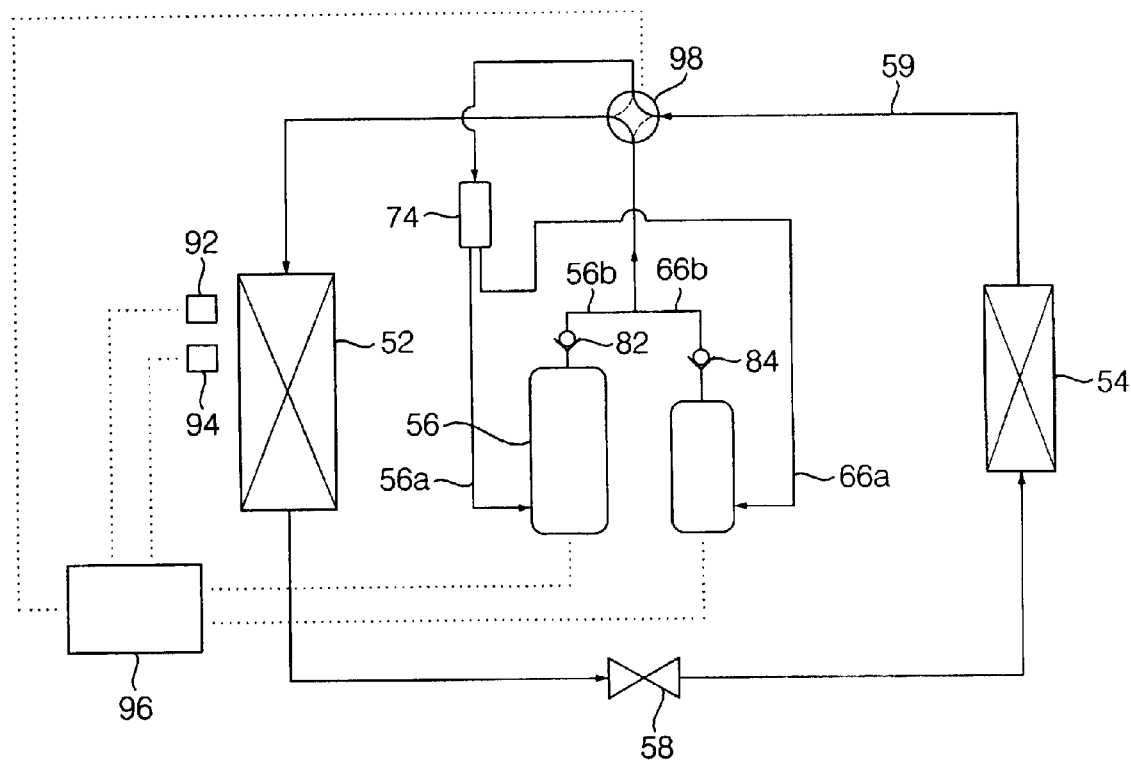
FIG. 4 is a schematic diagram illustrating an air conditioner to which a warming mode operating method according to an embodiment of the present invention is applied.

FIG. 4 is a schematic diagram illustrating an air conditioner to which a warming mode operating method according to an embodiment of the present invention is applied. This air conditioner is of a type equipped with a plurality of compressors.

As shown in FIG. 4, the air conditioner includes an indoor heat exchanger 52 for heat-exchanging air in a room with a refrigerant, thereby cooling or warming the room air, and an outdoor heat exchanger 54 serving as a condenser for condensing the refrigerant when the indoor heat exchanger 52 functions as a cooler, while serving as an evaporator for evaporating the refrigerant when the indoor heat exchanger 52 functions as a heater. The air conditioner also includes first and second compressors 56 and 66 for compressing the refrigerant from a low-temperature and low-pressure gaseous state into a high-temperature and high-pressure gaseous state in order to supply the high-temperature and high-pressure gaseous refrigerant to the indoor heat exchanger 52 or outdoor heat exchanger 54. The first compressor 56 has a capacity of X%, for example, 60%, whereas the second compressor 66 has a capacity of Y%, for example, 40%. The air conditioner further includes an expansion device 58 arranged between the indoor heat exchanger 52 and the outdoor heat exchanger 54, and adapted to expand the refrigerant into a low-temperature and low-pressure state. The indoor heat exchanger 52, the outdoor heat exchanger 54, the first and second compressors 56 and 66, and the expansion device 58 are connected by a refrigerant pipe 59.

A common accumulator 74 is connected to respective suction lines 56a and 66a of the first and second compressors 56 and 66. The common accumulator 74 serves to store a liquid refrigerant not evaporated by the indoor heat exchanger 52 or outdoor heat exchanger 54, in order to prevent the liquid refrigerant from being introduced into the first and second compressors 56 and 66.

Check valves 82 and 84 are installed in respective discharge lines 56b and 66b of the first and second compressors 56 and 66. The check valves 82 and 84 serve to prevent the refrigerant discharged from the currently-operating compressor, for example, the first compressor 56, from being introduced into the currently-stopped compressor, for example, the second compressor 66.

The air conditioner further includes a temperature sensor 92 for sensing the room temperature, an operating panel 94 for inputting an operating signal for the air conditioner, and a control unit 96 for determining, based on signals outputted from the temperature sensor 92 and operating panel 94, whether the first and second compressors 56 and 66 are to be operated or stopped, and outputting control signals to the first and second compressors 56 and 66, respectively.

In FIG. 4, the reference numeral 98 denotes a direction change valve, for example, a 4-way valve, adapted to change the flowing direction of the refrigerant in accordance with a control signal generated from the control unit in response to an operation of the operating panel 94 so that the air conditioner is used for a cooling or warming purpose. This 4-way valve 98 communicates with the common accumulator 74 and respective discharge lines 56b and 66b of the first and second compressors 56 and 66. The 4-way valve 98 guides the high-temperature and high-pressure gaseous refrigerant compressed by the first compressor 56 or second compressor 66 to the outdoor heat exchanger 54 in a cooling mode, while it guides the same gaseous refrigerant to the indoor heat exchanger 52 in a warming mode.

Figure 5:
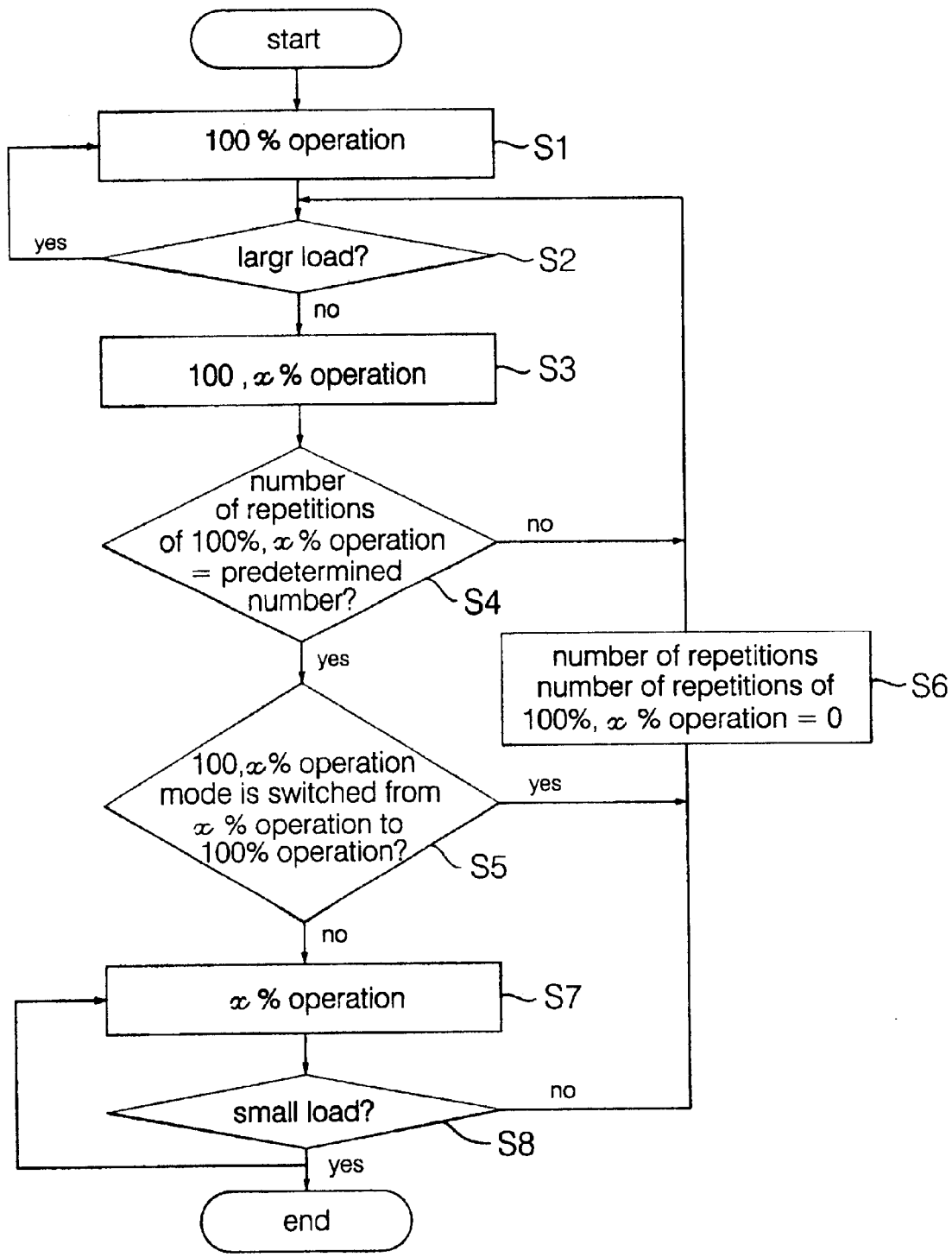
FIG. 5 is a flow chart illustrating a method for operating the air conditioner having the above-described configuration in a warming mode in accordance with an embodiment of the present invention.
Figure 6:
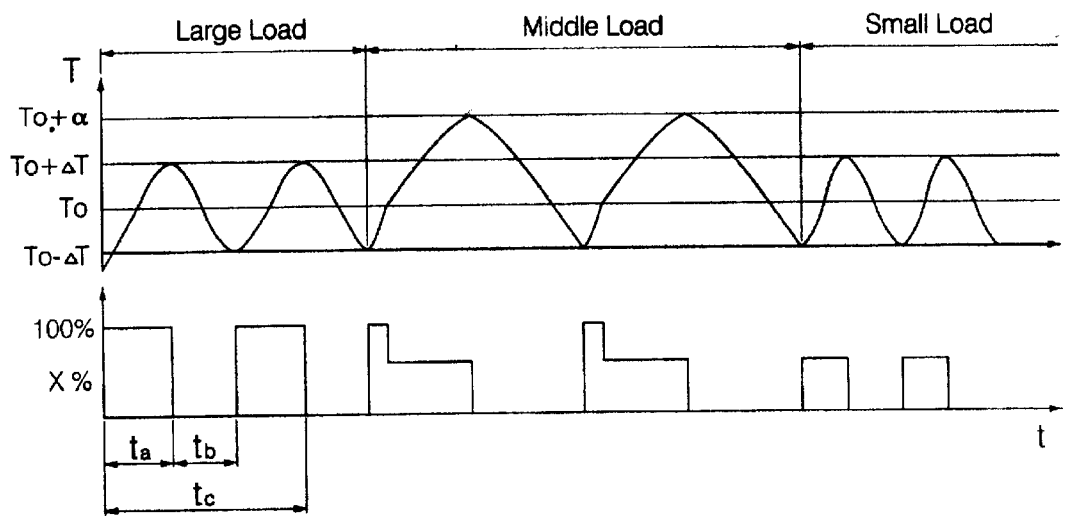
FIG. 6 is a graph depicting a variation in compression capacity depending on a variation in room temperature in the warming mode of the air conditioner in accordance with the embodiment of the present invention.
Figure 7:
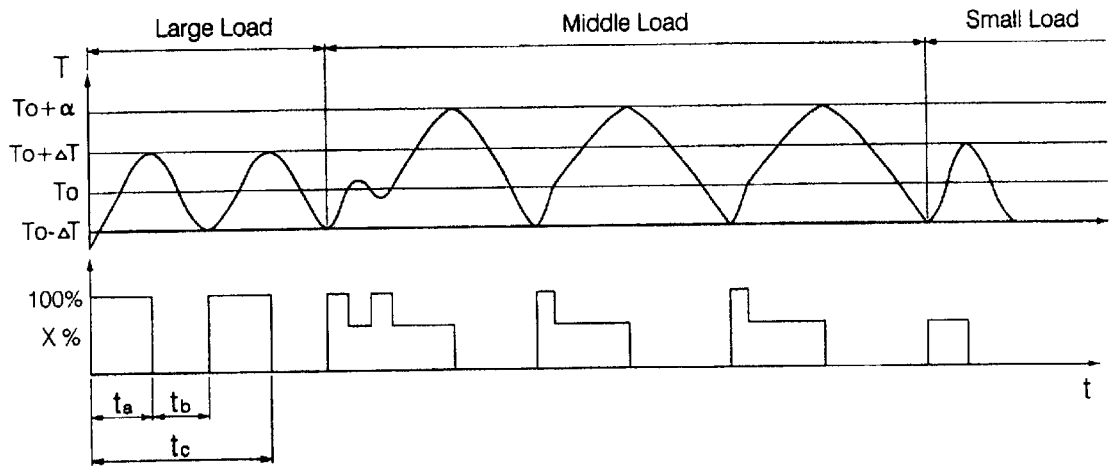
FIG. 7 is a graph depicting a variation in compression capacity depending on a variation in room temperature in the warming mode of the air conditioner in accordance with another embodiment of the present invention.

FIG. 5 is a flow chart illustrating a method for operating the air conditioner having the above-described configuration in a warming mode in accordance with an embodiment of the present invention. FIG. 6 is a graph depicting a variation in compression capacity depending on a variation in room temperature in the warming mode of the air conditioner in accordance with the embodiment of the present invention. FIG. 7 is a graph depicting a variation in compression capacity depending on a variation in room temperature in the warming mode of the air conditioner in accordance with another embodiment of the present invention.

Now, the operating method of the present invention will be described with reference to FIGS. 4 to 7. When the air conditioner is set to operate in a warming mode under the condition in which a target temperature To is set, in accordance with an operation of the operating panel 94, the control unit 96 first switches the operating position of the 4-way valve 98 to correspond to the warming mode.

Thereafter, the control unit 96 compares the room temperature T with the target temperature $T_0$. When it is determined that the room temperature T is lower than the target temperature $T_0$, a 100% operation is carried out in which both the first and second compressors 56 and 66 are operated (Step S1).

In accordance with the operations of the first and second compressors 56 and 66, the room temperature T is increased. When the room temperature T reaches an upper temperature limit of $T_0+\Delta T$ higher than the target temperature $T_0$ by an allowable temperature deviation $\Delta T$ of, for example, 0.5° C., the control unit 96 stops the first and second compressors 56 and 66 to complete the 100% operation.

After the completion of the 100% operation, the control unit 96 determines the current warming load (Step S2).

This warming load determination is achieved by sensing the time $t_a$ taken until the first and second compressors 56 and 66 are stopped after beginning to operate, and determining the warming load to be large when the sensed time $t_a$ is not less than a first predetermined time $t_x$, while determining the warming load to be small when the sensed time $t_a$ is less than the first predetermined time $t_x$.

Further, the warming load determination may be achieved by sensing the time $t_b$ taken until the room temperature T reaches a lower temperature limit of $T_0-\Delta T$ lower than the target temperature $T_0$ by an allowable temperature deviation $\Delta T$ of, for example, 0.5° C., after the first and second compressors 56 and 66 operating in the 100% operation mode are stopped, and determining the warming load to be large when the sensed time $t_b$ is not more than a second predetermined time $t_y$, while determining the warming load to be small when the sensed time $t_b$ is more than the second predetermined time $t_y$.

Moreover, the warming load determination may be achieved by sensing the time $t_a$ taken until the first and second compressors 56 and 66 are stopped after beginning to operate and the time $t_b$ taken until the room temperature T reaches a lower temperature limit of $T_0-\Delta T$ lower than the target temperature $T_0$ by an allowable temperature deviation $\Delta T$ of, for example, 0.5° C., after the first and second compressors 56 and 66 operating in the 100% operation mode are stopped, and determining the warming load to be large when the sum total of the sensed times $t_a+t_b$ is not less than a third predetermined time, while determining the warming load not to be large when the sum total of the sensed times $t_a+t_b$ is less than the third predetermined time.

Otherwise, the warming load determination may be achieved by sensing the time taken until the first and second compressors 56 and 66 are operated/stopped two times, and determining the warming load to be large when the sensed time is not less than a predetermined time, while determining the warming load not to be large when the sensed time is less than the predetermined time.

If it is determined that the warming load is large, the control unit 96 then repeats the 100% operation. If not, the control unit 96 performs a 100%/X% operation by stopping the second compressor 66 after the 100% operation of operating both the first and second compressors 56 and 66, thereby performing an X% operation, and subsequently stopping the first compressor 56 (Step S3).

The repetition of the 100% operation is achieved by operating both the first and second compressors 56 and 66 when the room temperature T is lowered to the lower temperature limit of $T_0-\Delta T$ lower than the target temperature $T_0$ by the allowable temperature deviation $\Delta T$ after the completion of the 100% operation, and stopping the first and second compressors 56 and 66 when the room temperature T is increased to the upper temperature limit of $T_0+\Delta T$ higher than the target temperature $T_0$ by the allowable temperature deviation $\Delta T$ (for example, 0.5° C.) in accordance with the operations of the first and second compressors 56 and 66, thereby completing the 100% operation.

Meanwhile, the 100%/X% operation is achieved by a control operation of the control unit 96 for operating both the first and second compressors 56 and 66, that is, performing the 100% operation, when the room temperature T is lowered to the lower temperature limit of $T_0-\Delta T$ after the completion of the 100% operation, and stopping the second compressor 66 when the room temperature T increases above the target temperature $T_0$ in accordance with the operations of the first and second compressors 56 and 66, so as to operate only the first compressor 56, thereby performing the X% operation.

That is, since most warming loads are eliminated in accordance with the initial 100% operation, and a subsequent warming load is substantially eliminated in accordance with the 100% operation of the 100%/X% operation mode (Step S4), the compressor operation mode is switched from the 100% operation to the X% operation so as to reduce the consumption of electric power.

In accordance with the operation of the first compressor 56 alone in the 100%/X% operation mode, the room temperature T may be maintained at the target temperature $T_0$, may continuously increase above the target temperature $T_0$, as shown in FIG. 6, or may be continuously lowered below the target temperature $T_0$, as shown in FIG. 7.

When the room temperature T increases continuously and reaches a predetermined temperature of $T_0+\alpha$ higher than the target temperature $T_0$ by a certain temperature deviation $\alpha$ of, for example, 1°, as shown in FIG. 6, the control unit 96 determines that the warming load is completely eliminated. Based on this determination, the control unit 96 completes the 100%/X% operation by stopping the currently-operating first compressor 56.

The predetermined temperature of $T_0+\alpha$ is a reference temperature higher than the upper temperature limit of $T_0+\Delta T$ (the target temperature $T_0$+the allowable temperature deviation $\Delta T$). Accordingly, it is possible to minimize the number of repetitions of the 100%/X% operation because the execution time of the X% operation in the 100%/X% operation mode is lengthened, as compared to the case in which the predetermined temperature of $T_0+\alpha$ is equal to or lower than the upper temperature limit of $T_0+\Delta T$.

On the other hand, when the room temperature T is lowered below the target temperature $T_0$, as shown in FIG. 7, the control unit 96 determines that the warming load has not been eliminated yet. Based on this determination, the control unit 96 again operates the stopped second compressor 66 until the room temperature T reaches the target temperature $T_0$. When the room temperature T reaches the target temperature $T_0$, the control unit 96 again stops the second compressor 66.

Following the 100%/X% operation, the control unit 96 senses the number of times the first compressor 56 is stopped, i.e., the number of times the 100%/X% operation is repeated, and compares the sensed number of stoppages of the first compressor 56, i.e., the sensed number of repetitions of the 100%/X% operation, to a predetermined number (Step S4).

When the number of stoppages of the first compressor 56 does not reach the predetermined number, the control unit 96 determines the current warming load, and performs the 100% operation if it is determined that the warming load is large, while repeating the 100%/X% operation if it is determined that the warming load is not large.

Here, the predetermined number is a reference number of repetitions of the 100%/X% operation in order to completely eliminate the warming load. Preferably, the predetermined number is more than 2.

When the number of stoppages of the first compressor 56 reaches the predetermined number, the control unit 96 determines whether the stopped second compressor 66 is re-operated during the 100%/X% operation mode, i.e., whether the 100%/X% operation mode is switched from the X% operation to the 100% operation (Step S5).

When the second compressor 66 is re-operated, the control unit 96 resets the number of stoppages of the first compressor 56 to be "0", and then again counts the number of stoppages of the first compressor 56, i.e., the number of repetitions of the 100%/X% operation. Then, the 100% operation is carried out if it is determined that the warming load is large, while the 100%/X% operation is repeated if it is determined that the warming load is not large (Step S6).

On the other hand, when the second compressor 66 is not re-operated, the X% operation is carried out by operating/stopping the first compressor 56 alone under the condition that the second compressor 66 is maintained in a stopped state (Step S7).

That is, since the control unit 96 determines the warming load using the number of stoppages of the first compressor 56 after the 100%/X% operation, and simultaneously determines whether the second compressor 66 is re-operated or not after the 100%/X% operation, the air conditioner of the present invention can precisely and rapidly cope with the fine variation of the warming load.

The X% operation is achieved by a control operation of the control unit 96 for operating only the first compressor 56 when the room temperature T is lowered to the lower temperature limit of $T_0-\Delta T$ after the completion of the 100%/X% operation, and subsequently stopping the first compressor 56 when the room temperature T increases to the upper temperature limit of $T_0+\Delta T$ in accordance with the operation of the first compressor 56, thereby completing the X% operation.

Following the completion of the X% operation, the control unit 96 determines the current warming load (Step S8).

When it is determined that the warming load is small, the control unit 96 repeats the X% operation. On the other hand, when the warming load is determined not to be small, the control unit 96 determines again whether or not the warming load is large. If the warming load is determined to be large, the 100% operation is carried out. If not, the 100%/X% operation is carried out.

Meanwhile, although not shown in FIG. 5, the user can stop the operation of the air conditioner under any operating condition of the air conditioner, if necessary.

As apparent from the above description, the present invention provides a method for operating an air conditioner equipped with a plurality of compressors in a warming mode, including Disclosed is a method for operating an air conditioner in a warming mode, including the 100% operation performing step of operating/stopping all of compressors, the load determining step of determining a warming load to be eliminated after completion of the 100% operation performing step, the 100%/X% operation performing step of operating all of the compressors when it is determined at the load determining step that the warming load is not large, subsequently stopping a part of the compressors, and subsequently stopping the remainder of the compressors, the sensing step of sensing the number of stoppages of the remainder of the compressors after completion of the 100%/X% operation performing step, and the X% operation performing step of operating/stopping the remainder of the compressors when the sensed number of stoppage times reaches a predetermined number. In accordance with the method of the present invention, since the 100%/X% operation is carried out in response to a warming load generated after the 100% operation, it is possible to properly cope with the warming load at an initial stage of the warming mode. Further, since the X% operation is carried out after the 100%/X% operation is repeated in a predetermined number, the method of the present invention precisely and promptly copes with the variation of the warming load.

The 100%/X% operation step includes the step of re-operating the stopped part of the compressors when a temperature of the room is lower than a target temperature after the stopping of the part of the compressors. In the case that the 100%/X% operation step includes the step of re-operating the stopped part of the compressors, the number of stoppages is reset to be "0". Accordingly, it is possible to precisely cope with the fine variation of the warming load.

In accordance with the method of the present invention, the predetermined number is more than 2. Therefore, it is possible to effectively cope with the variation of the warming load in the 100%/X% operation mode.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an air conditioner equipped with a plurality of compressors in a warming mode by operating a part or all of the compressors in accordance with a warming load to warm air in a room, comprising the steps of:
   (A) operating/stopping all of the compressors;
   (B) determining a warming load to be eliminated after execution of the step (A);
   (C) operating all of the compressors when it is determined at the step (B) that the warming load is not large, subsequently stopping a part of the compressors, and subsequently stopping the remainder of the compressors;
   (D) sensing the number of stoppages of the remainder of the compressors after execution of the step (C); and
   (E) operating/stopping the remainder of the compressors when the number of stoppages sensed at the step (D) reaches a predetermined number.

2. The method according to claim 1, wherein the step (B) includes the steps of:
   (B-1) sensing a time taken until all of the compressors are stopped after beginning to operate at the step (A); and
   (B-2) determining the warming load to be large when the sensed time is not less than a predetermined time, while determining the warming load not to be large when the sensed time is less than the predetermined time.

3. The method according to claim 1, wherein the step (B) includes the steps of:
   (B-1) sensing a time taken until a temperature of the room reaches a temperature lowered from a target temperature by an allowable temperature deviation after all of the compressors are stopped at the step (A); and
   (B-2) determining the warming load to be large when the sensed time is not more than a predetermined time, while determining the warming load not to be large when the sensed time is more than the predetermined time.

4. The method according to claim 1, wherein the step (B) includes the steps of:
   (B-1) sensing a time taken until all of the compressors are stopped after beginning to operate at the step (A), and another time taken until a temperature of the room reaches a temperature lowered from a target temperature by an allowable temperature deviation after all of the compressors are stopped; and
   (B-2) determining the warming load to be large when the sum total of the sensed times is not less than a predetermined time, while determining the warming load not to be large when the sum total of the sensed times is less than the predetermined time.

5. The method according to claim 1, wherein the step (B) includes the steps of:
   (B-1) sensing a time taken until all of the compressors are operated and stopped two times at the step (A); and
   (B-2) determining the warming load to be large when the sensed time is not less than a predetermined time, while determining the warming load not to be large when the sensed time is less than the predetermined time.

6. The method according to claim 1, wherein the step (C) includes the step of operating all of the compressors when a temperature of the room is lower than a temperature lowered from a target temperature by an allowable temperature deviation.

7. The method according to claim 1, wherein the step (C) includes the step of stopping the part of the compressors when a temperature of the room is not lower than a target temperature.

8. The method according to claim 1, wherein the step (C) includes the step of stopping the remainder of the compressors when a temperature of the room is not lower than a predetermined temperature after the stopping of the part of the compressors.

9. The method according to claim 1, wherein the step (C) includes the step of re-operating the stopped part of the compressors when a temperature of the room is lower than a target temperature after the stopping of the part of the compressors,
   wherein the step (D) includes the step of resetting the number of stoppages of the remainder of the compressors to be "0".

10. The method according to claim 1, wherein the predetermined number is more than 2.

* * * * *